United States Patent
Zinner

(10) Patent No.: US 12,255,735 B2
(45) Date of Patent: Mar. 18, 2025

(54) METHOD FOR SECURING THE TIME SYNCHRONIZATION OF AN ETHERNET ON-BOARD NETWORK

(71) Applicant: Continental Automotive GmbH, Hannover (DE)

(72) Inventor: Helge Zinner, Hannover (DE)

(73) Assignee: Continental Automotive GmbH, Hannover (DE)

( * ) Notice: Subject to any disclaimer, the term of this patent is extended or adjusted under 35 U.S.C. 154(b) by 119 days.

(21) Appl. No.: 17/781,520

(22) PCT Filed: Dec. 16, 2020

(86) PCT No.: PCT/EP2020/086467
§ 371 (c)(1),
(2) Date: Jun. 1, 2022

(87) PCT Pub. No.: WO2021/122778
PCT Pub. Date: Jun. 24, 2021

(65) Prior Publication Data
US 2023/0006751 A1    Jan. 5, 2023

(30) Foreign Application Priority Data
Dec. 18, 2019   (DE) ..................... 10 2019 220 096.6

(51) Int. Cl.
| | | |
|---|---|---|
| *H04L 67/12* | (2022.01) | |
| *H04J 3/06* | (2006.01) | |
| *H04L 9/40* | (2022.01) | |

(52) U.S. Cl.
CPC ........ *H04J 3/0682* (2013.01); *H04L 63/0428* (2013.01); *H04L 67/12* (2013.01)

(58) Field of Classification Search
CPC ... H04J 3/0682; H04J 3/0667; H04L 63/0428; H04L 67/12; H04L 2463/121;
(Continued)

(56) References Cited

U.S. PATENT DOCUMENTS

| | | |
|---|---|---|
| 7,072,469 B1 | 7/2006 | Oudaltsov et al. |
| 8,386,765 B2 | 2/2013 | Fries et al. |

(Continued)

FOREIGN PATENT DOCUMENTS

| | | |
|---|---|---|
| CN | 101980557 A | 2/2011 |
| CN | 104584468 A | 4/2015 |

(Continued)

OTHER PUBLICATIONS

Global Time Synchronization in an Automotive Ethernet Network—Everything Done?, Vector, 2015 (Year: 2015).*

(Continued)

*Primary Examiner* — Lan-Huong Truong
(74) *Attorney, Agent, or Firm* — Buchanan Ingersoll & Rooney PC

(57) ABSTRACT

A method for securing the time synchronization of an Ethernet on-board network of a motor vehicle, by: determining a delay time of a first signal on a first connecting path between a first control unit of the network and a second control unit of the network; determining a maximum speed of the first connecting path on the basis of the delay time; and determining a type of a transmission medium of the first connecting path on the basis of the maximum speed. The determination of the delay time of a first signal, the determination of the maximum speed of the first connecting path, and the determination of the type of a transmission medium of the first connecting path result in an entropy source being formed that is used to ascertain at least one dynamic key for the connecting path to encrypt a time synchronization message for the connecting path.

17 Claims, 17 Drawing Sheets

(58) Field of Classification Search
CPC . H04L 47/283; H04L 43/0858; H04L 63/067; H04L 63/1408; H04Q 2213/1336

See application file for complete search history.

(56) References Cited

U.S. PATENT DOCUMENTS

| | | | |
|---|---|---|---|
| 10,529,162 | B2 | 1/2020 | Fujiwara et al. |
| 2013/0142323 | A1* | 6/2013 | Chiarella .................. G06F 7/58 |
| | | | 380/28 |
| 2015/0171980 | A1 | 6/2015 | Bui et al. |
| 2015/0236940 | A1 | 8/2015 | Zinner et al. |
| 2016/0087899 | A1* | 3/2016 | Katevenis ............... H04L 47/22 |
| | | | 370/230 |
| 2016/0149867 | A1 | 5/2016 | Lohr |
| 2018/0034794 | A1 | 2/2018 | Pandey et al. |
| 2019/0286421 | A1 | 9/2019 | Felber et al. |
| 2019/0363815 | A1 | 11/2019 | Bogenberger et al. |
| 2021/0120386 | A1 | 4/2021 | Zinner et al. |

FOREIGN PATENT DOCUMENTS

| | | |
|---|---|---|
| CN | 105409157 A | 3/2016 |
| CN | 110168494 A | 8/2019 |
| DE | 102005025328 A1 | 12/2006 |
| DE | 102015206169 | 10/2016 |
| DE | 102012216689 | 5/2017 |
| DE | 102018205264 | 10/2019 |
| EP | 1 071 242 A1 | 1/2001 |
| EP | 2974504 | 6/2018 |
| JP | 2003273856 A | 9/2003 |
| JP | 2004264120 A | 9/2004 |
| JP | 2007181078 A | 7/2007 |
| JP | 2016230728 A | 12/2015 |
| JP | 2018145766 A | 9/2018 |
| WO | 2019001929 A1 | 1/2019 |
| WO | WO-2019197233 A1 * | 10/2019 ......... H04L 43/0852 |

OTHER PUBLICATIONS

Office Action (Notice of Reasons for Refusal) issued Mar. 5, 2024, by the Japan Patent Office in corresponding Japanese Patent Application No. 2022-537050 and an English translation of the Office Action. (4 pages).

Jesse, "Global Time Synchronization in an Automotive Ethernet Network—Everything Done?", Vector Informatik GmbH, Oct. 15, 2015, 22 pages.

Matheus, Summary and Interpretation of the Results from the AB B/TSN Workshop, Feb. 6, 2017, 11 pages.

German Examination Report for German Application No. 10 2019 220 096.6, dated Nov. 12, 2020 with translation, 8 pages.

International Search Report and Written Opinion for International Application No. PCT/EP2020/086467, dated Apr. 8, 2021, 8 pages.

International Search Report and Written Opinion for International Application No. PCT/EP2020/086467, dated Apr. 8, 2021. 13 pages (German).

Jesse, Time Synchronization in Automotive Ethernet Networks Balancing Act Between Autosar, IEEE, and TSN, Automobil Elektronik, Aug. 2016, with translation, 8 pages.

Japanese Notice of Reasons for Refusal for Japanese Application No. 2022-537050, dated Jul. 4, 2023 with translation, 7 pages.

Office Action (The First Office Action) issued Dec. 11, 2024, by the State Intellectual Property Office of People's Republic of China in corresponding Chinese Patent Application No. 202080087517.2 and an English machine translation of the Office Action. (20 pages).

* cited by examiner

= link delay
(very specific and with variations)

=NRR (very specific and with variations)

METHOD FOR SECURING THE TIME SYNCHRONIZATION OF AN ETHERNET ON-BOARD NETWORK

CROSS REFERENCE TO RELATED APPLICATIONS

This application is the U.S. National Phase Application of PCT International Application No. PCT/EP2020/086467, filed Dec. 16, 2020, which claims priority to German Patent Application No. 10 2019 220 096.6, filed Dec. 18, 2019, the contents of such applications being incorporated by reference herein.

FIELD OF THE INVENTION

The present invention relates to communication networks containing network devices synchronized to one another.

BACKGROUND OF THE INVENTION

Automobile manufacturers (OEMs) and tier-1 suppliers in the automotive industry are preparing the next generation of architecture for vehicle controllers or electronic control devices/control units, ECUs. One development is what is known as the "zone-oriented architecture", in which control devices are grouped into zones, such as e.g. a front right door zone. A difference from previous architectures is that the controllers are located at specific physical or spatial positions in order to optimally capture the data from the sensors positioned there. As such, for example a control unit that collects data from a sensor in the front right door may be positioned in the front right door zone.

The localization or distribution of software execution for features and applications to other controllers and processors is also under consideration. Such localization or distribution may be part of an optimization and may also be used in the event of an error or failure, e.g. of a control device. This localization or distribution is known as dynamic migration or simply migration. Mass production for the dynamic migration of software to other control devices/processors within the vehicle is expected soon.

Ethernet may be the network of choice for connecting control devices in a network. Ethernet technology is becoming increasingly popular for the electrical systems of vehicles and supplier products. The use of Ethernet technology requires an effective synchronization concept.

Existing Ethernet systems may use an implementation of the time synchronization standard IEEE 802.1AS. Two variants that have attracted particular attention are the selection of the 802.1AS-Rev and the time domain of the 802.1AS-Rev, the latter being a mandatory requirement for the former. Other protocols outside of the physical transmission standards are Ethernet AVB and its successor Ethernet TSN. Ethernet AVB has already been introduced for automobiles in mass production. An essential substandard for Ethernet TSN and AVB is the time synchronization standard IEEE 802.1AS, which depends on the main standard IEEE 802.1 for higher layer LAN protocols (bridging). Both standards use the IEEE 1588 Precision Time Protocol (PTP) to establish a common time base in an Ethernet network.

On layer 3 of the OSI layer model, Ethernet connections support a large number of switching protocols for the transmission of data packets between transmitters and receivers. In the higher protocol layers, the segmentation of the data stream into packets, the process communication between communicating systems, the translation of data into a system-independent form and finally the provision of functions for applications take place.

Almost all Ethernet communication networks used in vehicles use a protocol relating to time synchronization that provides a global network time base that is synchronous in all network devices. The prevalence of time-synchronized network devices is expected to continue to increase in the future.

The IEEE 802.1AS standard provides such a protocol relating to time synchronization. Based on a so-called "best clock" in the network, also known as a grandmaster or grandmaster clock, a master-slave clock hierarchy is set up. The grandmaster provides the time base for the network, to which all other network devices in the network are synchronized. The grandmaster is determined by means of the so-called Best Master Clock Algorithm (BMCA) and is announced within the network. To do this, IEEE 802.1AS compatible network devices send Announce messages containing information about their internal clock to other network devices that are directly connected. The information about the internal clocks provides an indication of the accuracy of the respective clock, the reference or time reference thereof and other properties that can be used to determine the best clock in the network. A recipient of such an Announce message compares the information received with the features of its own internal clock and any messages already received from another port with information relating to clocks of other network devices, and accepts a clock in another network device if it has better clock parameters. After a short time, the best clock in the network has been ascertained, which then becomes the grandmaster in the network. Based on the grandmaster, messages relating to time synchronization are broadcast over the network. A network device that receives a message relating to time synchronization does not simply forward it, but rather corrects the time information for the previously ascertained delay time on the connection by way of which it receives messages relating to time synchronization from a directly connected network device, and also for the internal processing time, before it retransmits the message relating to time synchronization with the corrected time information.

In the case of the clock hierarchy according to IEEE 802.1AS and the generalized precision time protocol (gPTP) defined therein, only a single network device always provides the best clock in the network. This network device therefore controls and regulates the whole time of the vehicle. All other clocks in network devices in the network are governed exclusively by this one clock. Some vehicle manufacturers even synchronize networks of other standards, for example CAN, by way of this Ethernet time master, which means that almost all network devices in the vehicle are informed of the system time by the network device that provides the grandmaster. As a result, a single network device is defined as a single point of failure in the network or the vehicle, the failure or manipulation of which device can have serious effects on the operational safety of the vehicle. As such, for example in vehicles with a high degree of driver support by appropriate systems or with systems for (semi) autonomous driving, a large volume of sensor data captured within a narrow time window must be processed together in order to derive appropriate control signals for actuators in the vehicle. The most accurate possible time registration for sensor data may also be of great importance for documentation purposes, for example when storing in log files that can be analyzed in order to reconstruct malfunctions or operating errors. The latter is of great interest in particular to insurance companies and law enforcement agencies. Safe, synchronized provision of the time information is thus essential.

To detect attacks of this type, DE 10 2012 216 689 B4, incorporated herein by reference, proposes monitoring delay times of messages relating to time synchronization within the communication network. An additional network device connected between two network devices that intercepts and forwards messages will inevitably alter the delay time of the messages, even if the forwarded message is not altered.

Taking the example of using AUTOSAR considerations too, almost all data interchanged between the control units are transmitted by means of IP, and therefore the IP layer, i.e. all features and services of the IP layer are used. Here the focus is on IP-Sec. IPsec, short for Internet Protocol Security, is a suite of protocols intended to allow secure communication over IP networks. The goal is to provide encryption-based security at network level. IPsec affords this possibility by virtue of the connectionless integrity and also the access control and authentication of the data. In addition, IPsec ensures the confidentiality and authenticity of the packet sequence through encryption.

The time synchronization, as can be seen from the example of gPTP or 802.1AS, is not transmitted via the IP layer, but rather is not yet protected in the vehicle. Comparable protocols such as IPSec do not yet exist on the lower layers in automobiles, or would lead to much higher costs, e.g. MACSEC. In general, the messages are transported by means of Ethernet. Ethernet is the actual transport protocol here, i.e. the messages are not transported via the IP layer. The protection mechanisms that are implemented and available there cannot be used.

Thus, today's methods and protocols relating to time synchronization do not provide any easy options for protection. Each network device can easily infer which network device in the network is the grandmaster from the messages relating to time synchronization that are sent as simple multicast Ethernet frames to multiple or all network devices in the network. Protection mechanisms on higher protocol layers such as IPSEC or TLS and the like are not yet able to take effect on this level. On the other hand, if the time synchronization messages are sent via IP, the accuracy of the clock synchronization, or of the actual data fusion, is lost. The manipulation can have serious effects if, for example, data relating to sensor fusion are altered and data from e.g. a camera and a radar that do not belong together, however, are fused.

A few approaches for detecting changes in the configuration or structure of a communication network using the time synchronization of the network are known from the prior art. An unauthorized change to the configuration of the network may, by way of example, comprise the interposition of a network device to prepare for an attack, which intercepts messages for analysis and, if necessary, retransmits altered messages. This can be used to prevent or at least disrupt safe and proper operation.

SUMMARY OF THE INVENTION

An aspect of the invention is a method, a control device that implements the method, and an on-board network that ensure improved protection of the time synchronization.

In one embodiment of the method for securing the time synchronization of an Ethernet on-board network 2 of a motor vehicle 1, the following steps are carried out:
   determining a delay time 9 of a first signal 10 on a first connecting path 6 between a first control unit 3 of the Ethernet on-board network 2 and a second control unit 4 of the Ethernet on-board network 2;
   determining a maximum speed 11 of the first connecting path 6 on the basis of the delay time 9; and
   determining a type of a transmission medium 12 of the first connecting path 6 on the basis of the maximum speed 11.

The determination of the delay time 9 of a first signal 10 and the determination of the maximum speed 11 of the first connecting path and the determination of the type of a transmission medium 12 of the first connecting path 6 result in an entropy source being formed that is used to ascertain at least one dynamic key 28 for the connecting path 6 that is used to encrypt a time synchronization message for the connecting path 6.

In a further embodiment of the method, the dynamic key 28 for the connecting path 6 is formed in such a way that it is unique per unit time and for each link and in the Ethernet on-board network.

A further embodiment of the invention is distinguished in that the dynamic key 28 for the connecting path 6 is generated by combining a point-to-point line delay and the message frequency.

A further embodiment of the invention is distinguished in that the type of the transmission medium 12 is communicated to a program 13 in the Ethernet on-board network 2 and a connecting path selection 14 of the program 13 is adapted according to the type of the transmission medium 12 and the program 13 records all information of the entropy source and the dynamic key 28 for the connecting path 6 is generated.

In a further embodiment of the method, the type of the transmission medium 12 is determined as optical, copper or wireless.

A further embodiment of the invention is distinguished in that a transmission security value 15, which describes a probability of loss of data transmitted by way of the first connecting path 6, is assigned to the first connecting path 6 on the basis of the type of the transmission medium 12.

A further embodiment of the method is distinguished in that delay times of a plurality of signals on the first connecting path 6 are determined and the fastest delay time of the plurality of signals is selected, the maximum speed 11 of the first connecting path 6 being determined on the basis of the fastest delay time.

A further embodiment of the method is distinguished in that a delay time 16 of a second signal 17 on a second connecting path 7, which is different from the first connecting path 6, between the first control unit 3 and the second control unit 4 is determined, and a maximum speed 11 of the second connecting path 7 is determined, a type of the transmission medium 19 of the second connecting path 7 being determined on the basis of the maximum speed 11 of the second connecting path 7.

A further embodiment of the method is distinguished in that the method is performed after the first control unit 3 changes from a normal operating mode to an energy-saving mode and/or from the energy-saving mode to the normal operating mode.

In a further embodiment, the delay time 9 of the first signal 10 is determined using the first control unit 3 and a delay time 21 of a third signal 22 on a third connecting path 8, which is connected to the first control unit 3 only indirectly, between the second control unit 4 and a third control unit 5 of the Ethernet on-board network 2 is determined using the third control unit 5, the determination of the delay time 21 of the third signal 22 being triggered by a service message 20 sent from the first control unit 3 to the third control unit 5.

The embodiment of the control unit for an Ethernet on-board network 2, which, as first control unit 3, is designed:

to send a signal 10 to a second control unit 4 of the Ethernet on-board network 2 and to receive the signal 10 from the second control unit 4;

to determine a delay time 9 of the signal 10 on a connecting path 6 to the second control unit 4;

to determine a maximum speed 11 of the connecting path 6 on the basis of the delay time 9; and to determine a type of a transmission medium 12 of the connecting path 6 on the basis of the maximum speed 11, wherein the control unit 3 comprises at least
a microprocessor 402,
a volatile memory 404 and nonvolatile memory 406,
at least two communication interfaces 408,
and a synchronizable timer 410,
and the nonvolatile memory 406 contains program instructions that, when executed by the microprocessor 402, implement at least one embodiment of the method according to an aspect of the invention and the entropy source is formed in the volatile and/or nonvolatile memory 404, 406, said entropy source being used to form the dynamic keys 28 for the connecting paths 6.

An embodiment of the Ethernet on-board network 2 for a motor vehicle 1, having a first control unit 3 and a second control unit 4, wherein the control units 3, 4 are connected to one another by way of at least one connecting path 6, 7, and the first control unit 3 is designed.

Another embodiment of the Ethernet on-board network is distinguished in that the Ethernet on-board network 2 has a third control unit 5, which is connected to the first control unit 3 only indirectly and is connected to the second control unit 4 directly by way of a third connecting path 8, wherein the third control unit 5 is designed to determine a delay time 21 of a third signal 22 on the third connecting path 8, wherein the first control unit 3 is designed to trigger the determination of the delay time 21 of the third signal 22 by way of a service message 20 to the third control unit 5.

One embodiment is represented by a computer program product. The computer program product comprises instructions that, when the program is executed by a computer, cause said computer to perform the method 200.

One embodiment is provided on a computer-readable medium on which the computer program product.

One embodiment is provided in a vehicle having multiple control units 3, 4, 5, comprising an Ethernet on-board network.

An aspect of the invention increases security in the area of Ethernet and thus closes security gaps. Furthermore, a standardizable approach is specified that facilitates the use of Ethernet in automotive vehicles.

This method involves the control unit ascertaining a delay time for the data transfer via the on-board network to a second control unit. The important factor is that the delay time is ascertained in some form on the basis of an actual physical condition of the transmission path from the first control unit to the second control unit, i.e. there is a physical condition or property of the transmission path that, when it changes, results in a change in the ascertained delay time. An individual and constantly changing key is generated on the basis of the line delay and the message frequency. This key is unique per unit time and also different per link, and there is no key twice in the network.

In other words, the time synchronization messages are encrypted using a dynamic key that can be derived from individual parameters relating to the connection partner that form an entropy source.

Generation of the key from the combination of point-to-point line delay and the frequency of the crystal makes the key particularly resistant to attempts to circumvent it, since firstly the key is constantly changing and secondly it will be different on each link in the vehicle network. The two values can either be used directly in combination or can be expanded by other static values, which must be known to both control devices or control units, such as for example the address, in order to generate the keys.

In this context, the consideration of the previously ascertained delay time and the message frequency is an entropy source that further increases security. Typical random number generators for computers and in particular for embedded systems or network components are not "true" random number generators in the sense that a nondeterministic physical process, such as for example electronic noise or radioactive decay, is converted into a digital signal. Rather, pseudo-random number generators are used here. Starting from initialization, these generators generate numerical sequences in a deterministic manner and are often also reliant on quasi-random system events for initialization.

The effect provided by the method, namely protection against unauthorized eavesdropping, distortion of communication and against the exchange of devices, can also be achieved in other ways and with an even higher security level, for example by using hardware encryption, which is employed on the control unit or the on-board network.

In vehicles, on the other hand, it is generally not economical to equip all subscribers connected to the network with hardware equipment sufficient for seamlessly encrypted communication. The method described requires significantly fewer hardware resources and can be put into action using existing implementations, thus significantly increasing the security level without this necessarily being linked to higher production costs for the on-board network or devices connected thereto.

As described above, a major advantage of the method is that it can make use of the line leading from the first subscriber to the second subscriber as a means for the hardware-related generation of entropy for the random production of the time encryption even without using additional hardware. This method may be implemented in particular in the form of software that can be distributed as an update or upgrade for existing software or firmware of subscribers in the network and in this respect is an independent solution.

The quality of the execution of software-based applications (e.g. automated driving) can advantageously be increased by an aspect of the invention, in particular without additional financial outlay. The on-board network according to an aspect of the invention is improved in terms of costs and reliability. As a result, the meta information can be generated from the control units or the on-board network using software-based methods, so as then to create a higher level of functionality from this.

Advantageously, an aspect of the invention allows the security of a vehicle network to be increased significantly and very easily. The use of the newly introduced Ethernet protocol in automobiles necessitates mechanisms that make use of simple techniques and given properties of technologies in order to be able to do without expensive implementations and further additional hardware. Earlier detection of attacks and abnormal behavior by means of early analysis of the communication paths allows gaps and errors to be identified before the vehicle is delivered. The on-board network according to an aspect of the invention is improved in terms of costs and reliability. The testability of the on-board network is defined more clearly by an aspect of the invention, and test costs can be saved as a result. An aspect of the invention also affords a transparent security functionality.

The method presented ensures that every link in the vehicle and thus also every link in every vehicle worldwide has a different encryption. The on-board network is thus significantly more secure than comparable systems, since the key is constantly changing and is additionally based on a secure entropy source.

An aspect of the invention allows an increase in the quality of distributed applications such as for example sensor fusion. An advantage resulting from the application-specific determination of a better clock is in an improvement in the time synchronization for the selected application. This allows the maximum possible accuracy to be attained from this protocol, or similar protocols that have only one timing node. This results in more accurate synchronizations, which means that it is possible to dispense with more expensive crystals and components. This can also have an impact on buffer storage that is otherwise required, which can then be dispensed with or is made smaller. Fusions of different data, such as for example camera and radar, can thus be improved and made more accurate. Furthermore, the logging of data can be made even more precise.

An aspect of the invention achieves platform-independent software of higher quality. This method allows the software to be made more flexible and advantageously allows information from the underlying system to be used without having permanently programmed it into the software beforehand. An aspect of the invention permits software developers and software architects to provide software/applications that can be tailored to the requirements of the application more flexibly and precisely. Incorporating the cited methods into software allows optimization to take place in each case or within the control device. This means that software becomes more platform independent.

An advantage of an aspect of this invention is that the usual hardware does not have to be changed, but rather the existing hardware can continue to be used. The new method can be integrated into an existing network without damaging existing devices or control units. A standard that is used is not violated because the existing protocol can be used.

The selected network devices can start sending the encrypted messages relating to time synchronization as soon as the unique clock identification of the grandmaster clock ascertained during the initialization has been sent to all network devices. However, it is also possible to start sending the encrypted messages relating to time synchronization only when a first time synchronization of all network devices in the network has been completed.

The control units are connected to one another via physical interfaces. Messages relating to time synchronization are sent via a logical port defined for the interface, which means that there are point-to-point connections for the time synchronization between two network devices even when physical transmission media are shared. In the present description, the term interface is used synonymously with the term port, unless the context reveals otherwise.

A computer program product according to an aspect of the invention contains instructions that, when executed by a computer, cause said computer to perform one or more embodiments and further developments of the method described above.

The computer program product may be stored on a computer-readable medium or data carrier. The data carrier may be in a physical embodiment, for example as a hard disk, CD, DVD, flash memory or the like; however, the data carrier, or the medium, may also comprise a modulated electrical, electromagnetic or optical signal that can be received by a computer by means of an appropriate receiver and can be stored in the memory of the computer.

A control unit, at least according to an aspect of the invention, comprises at least one physical communication interface in addition to a microprocessor and nonvolatile and volatile memory and also a timer. The components of the control unit are communicatively connected to one another by means of one or more data lines or data buses. The memory of the control unit contains computer program instructions that, when executed by the microprocessor, configure the network device to implement one or more embodiments of the method described above.

The method according to an aspect of the invention can be implemented using existing network devices, wherein if necessary only adjustments in the software or in the state machines used for receiving and processing messages relating to time synchronization are required in order to use only the messages relating to time synchronization that come from the grandmaster clock ascertained during the initialization to synchronize the clocks, but still to forward the additional messages relating to time synchronization and not simply delete them. As a result, only low additional costs are incurred for the implementation, if at all. Even existing systems can be configured to implement the method, by way of appropriately changed software. Another advantage of the method according to an aspect of the invention is that the particular underlying hardware platform is irrelevant as long as it supports synchronization according to the IEEE 802.1AS standard.

BRIEF DESCRIPTION OF THE DRAWINGS

An aspect of the invention will be explained below by way of example with reference to the drawing. In the drawing.

Identical or similar elements may be referenced using the same reference signs in the figures.

DESCRIPTION OF EXEMPLARY EMBODIMENTS

Figure 1:
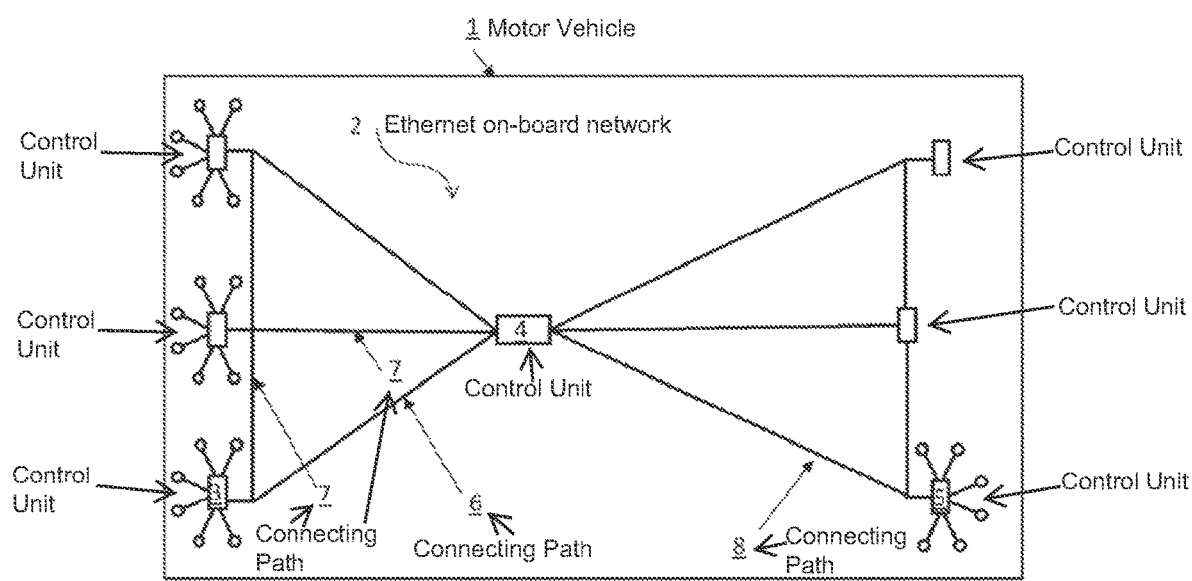
FIG. 1 shows a schematic plan view of a motor vehicle having an exemplary embodiment of an Ethernet on-board network according to the invention.

FIG. 1 shows a plan view of a motor vehicle 1. The motor vehicle 1 has an Ethernet on-board network 2. The Ethernet on-board network 2 in turn has, according to the exemplary embodiment, a plurality of control units 3, 4, 5, which can also be referred to as control apparatuses or control devices. In this case, the control units are connected to one another by way of connecting paths, which are named in FIG. 1 as first connecting path 6, second connecting path 7, third connecting path 8.

On account of the existing topology of the Ethernet on-board network 2 in the exemplary embodiment, there are multiple parallel communication paths between the control units. The connecting paths may be formed from different media types or materials, for example.

As the number of Ethernet variants increases, the dynamic change in the connection speed will also be used, for example. This means, for example, that the speed can be changed at runtime. For example, a 10 Gbit/s connecting path can be changed to 100 Mbit/s so that energy is saved. Since this is a dynamic function, it may be the case that the on-board network is in a different form after delivery or after initial installation in the motor vehicle than after a software update or in a fault situation, for instance.

The Ethernet on-board network 2 has at least one first control unit 3, a second control unit 4 and, in addition, a third control unit 5. The first control unit 3 is connected to the second control unit 4 by a first connecting path 6. Furthermore, the first control unit 3 according to the exemplary embodiment is also connected to the second control unit 4 by a second connecting path 7.

The first control unit 3, the second control unit 4 and/or the third control unit 5 may be in the form of a control device or network switch, for example. The second control unit 4 and the third control unit 5 are connected to one another by a third connecting path 8.

According to the exemplary embodiment from FIG. 1, the first control unit 3 and the second control unit 4 are connected to one another directly by way of the first connecting path 6, whereas the first control unit 3 and the second control unit 4 are connected only indirectly by way of the second connecting path 7, since the second connecting path 7 is divided into two parts by a further control unit. According to another exemplary embodiment, the second connecting path 7 can also connect the first control unit 3 and the second control unit 4 to one another directly, however.

Figure 2:
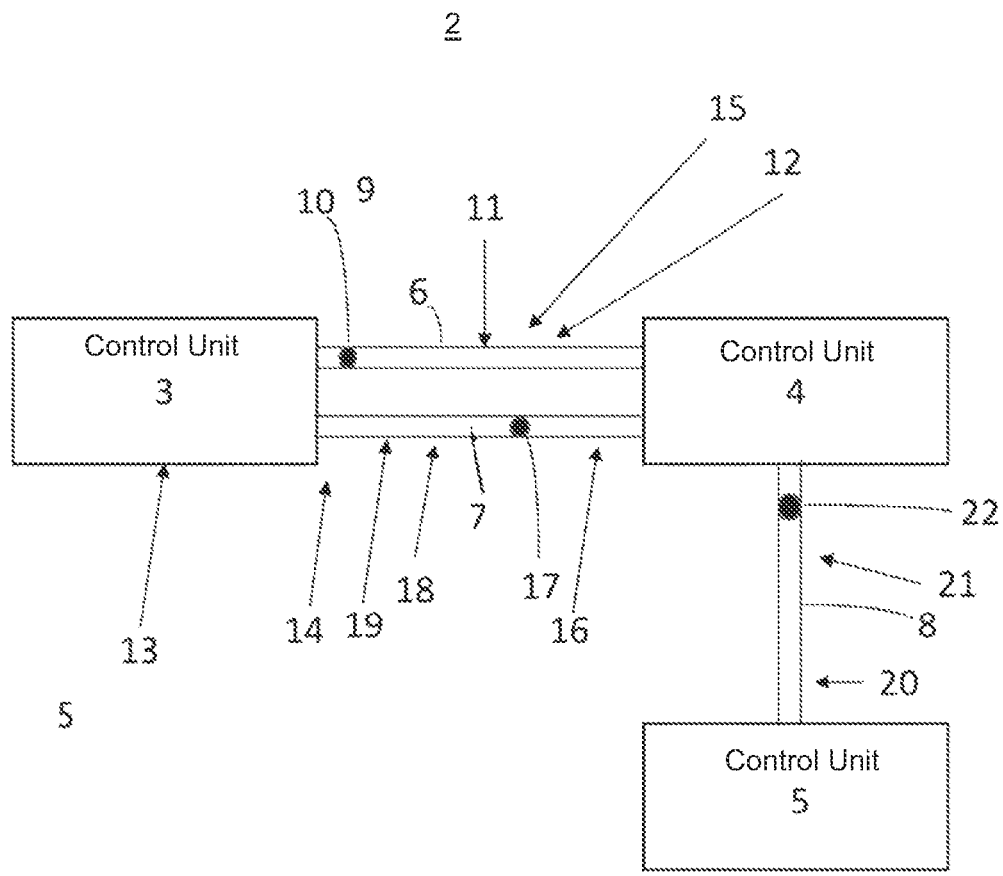
FIG. 2 shows a schematic representation of the Ethernet on-board network having a first control unit, a second control unit and a third control unit, which are connected by way of a first connecting path, a second connecting path and a third connecting path.

FIG. 2 shows a further exemplary embodiment of the Ethernet on-board network 2. The Ethernet on-board network 2 has the first control unit 3, the second control unit 4 and the third control unit 5. Furthermore, the Ethernet on-board network 2 also has the first connecting path 6, the second connecting path 7 and the third connecting path 8. According to the exemplary embodiment, a delay time 9 of a first signal 10 on the first connecting path 6 is determined. The delay time 9 describes the length of time for which the first signal 10 is in transit from the first control unit 3 to the second control unit 4, or vice versa, via the first connecting path 6. A maximum speed 11 of the first connecting path 6 is determined on the basis of the delay time 9 of the first signal 10. The maximum speed 11 of the first connecting path 6 varies in this case depending on the length of the cable, the speed of the transmission and/or the media type, or the type of transmission medium, for example. A type of a transmission medium 12 of the first connecting path 6 is determined on the basis of the maximum speed 11. FIG. 2 furthermore depicts program 13 running on the first control unit 3, connecting path selection 14, transmission security value 15, delay time of the second signal 16, second signal 17, maximum speed of the second connecting path 18, type of transmission medium of the second connecting path 19, service message 20, delay time of the third signal 21, third signal 22.

According to the exemplary embodiment, the type of the transmission medium 12 is defined as optical, copper or wireless. In the case of optical, the first connecting path 6 is in the form of an optical fiber connection, for example. In the case of copper, the first connecting path is formed, for example, by cables having twisted pairs of wires, for example an unshielded twisted pair (UTP) cable. In the case of wireless, the first connecting path 6 is substantially in the form of a radio link and the first control unit 3 and/or the second control unit 4 has/have a radio receiver and/or a radio transmitter, or is/are connected thereto.

Figure 3:
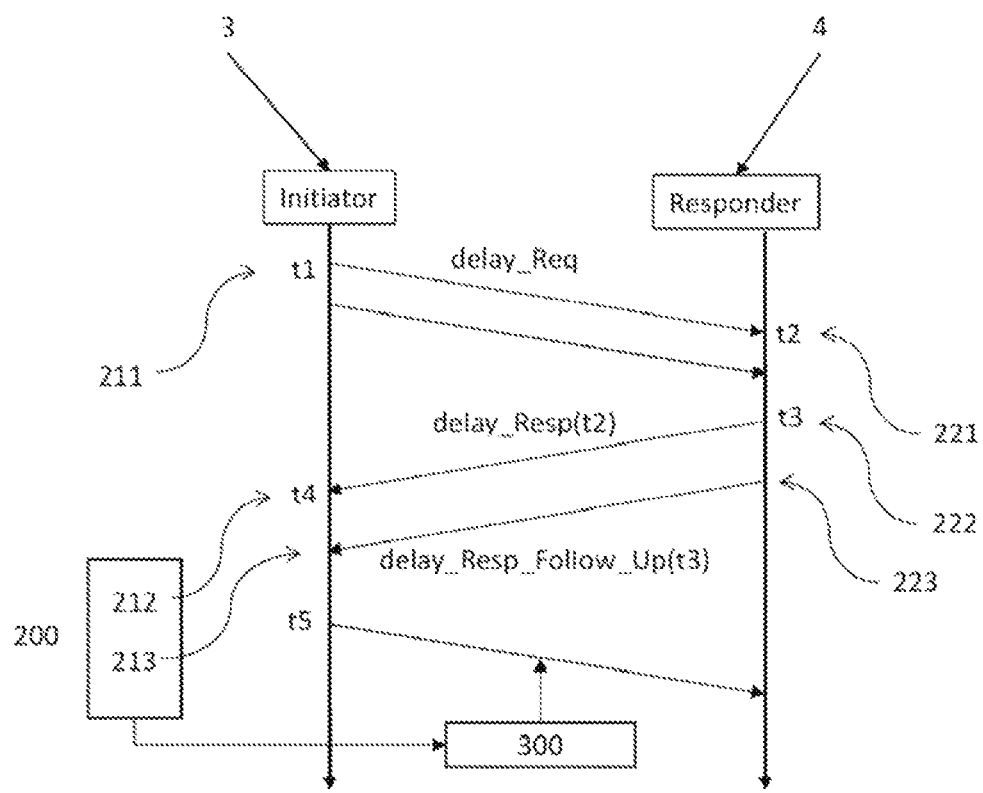
FIG. 3 shows a flowchart for the encryption of the time synchronization messages for determining a type of a transmission medium of the respective connecting path.
Figure 4:
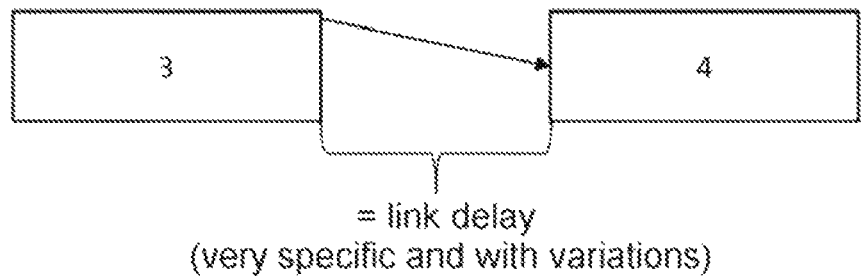
FIG. 4 shows a representation of the link delay of two connected control devices and measurement of the message frequency.
Figure 4:
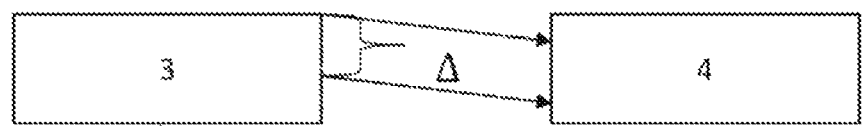
Figure 5:
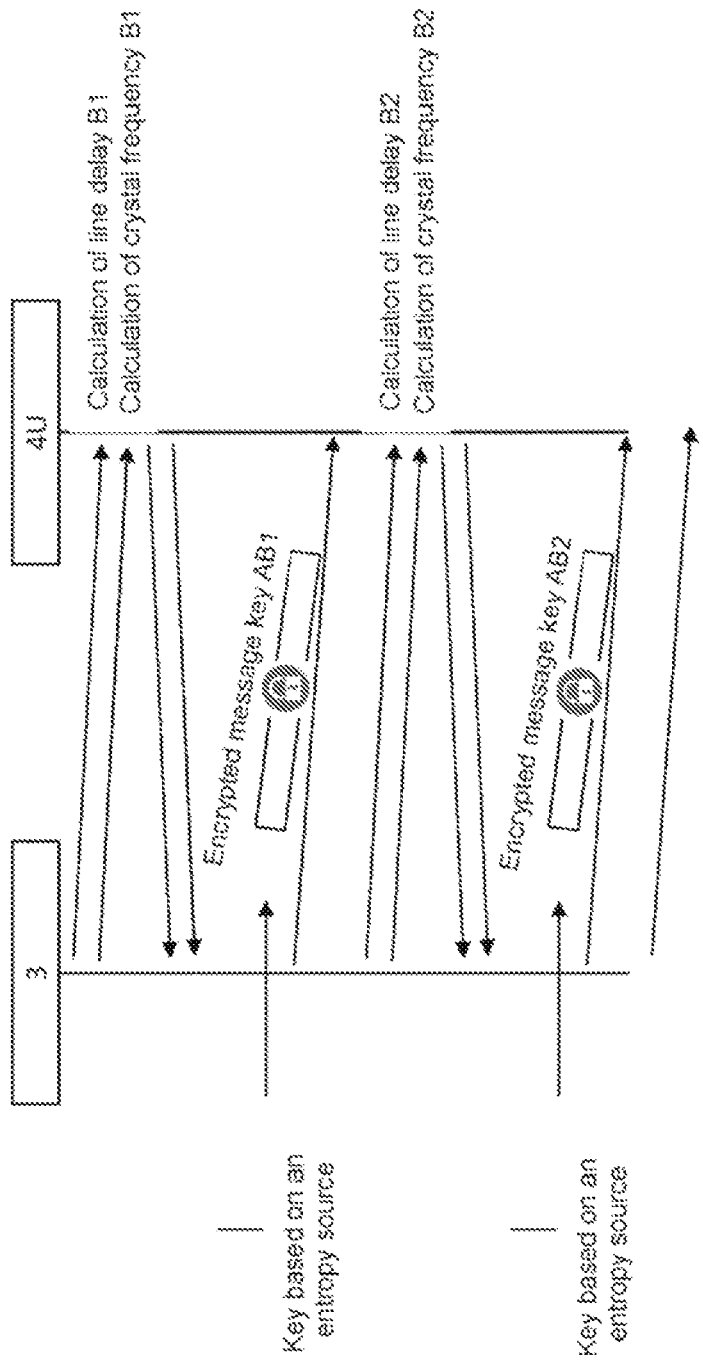
FIG. 5 shows a flowchart in which new keys are generated recurrently.

In connection with the sequence shown in FIG. 3, the control units 3 average a delay time for the data transfer via the on-board network to the control units 4. The important factor is that the delay time is ascertained in some form on the basis of an actual physical condition of the transmission path from the first control unit 3 to the control unit 4, i.e. there is a physical condition or property of the transmission path that, when it changes, results in a change in the ascertained delay time.

This presented method involves one control unit 3 ascertaining a delay time for the data transfer via the network to the control unit 4. This can be carried out in any desired manner. For example, the delay time may occur in the course of a time synchronization between the first subscriber and the second subscriber, for instance according to the time synchronization standard IEEE 802.1AS and the PTP protocol contained therein. As such, for example the "Delay Request" and "Peer Delay" messages implemented as part of this protocol can be used as data packets, as shown in FIG. 3. However, the method is not restricted to this. The important factor is only that the delay time is ascertained in some form on the basis of an actual physical condition of the transmission path from the first subscriber/control unit 3 to the second subscriber/control unit 4, i.e. there is a physical condition or property of the transmission path that, when it changes, results in a change in the ascertained delay time.

Furthermore, the first control unit 3 ascertains the message frequency, which in principle is derived from the speed of the PLL and crystal, of the opposite control unit 4. From these two values, which change constantly due to temperature, aging, etc., the control unit 3 derives a key for encrypting these time messages.

The time synchronization messages are encrypted using the generated dynamic key, which, expressed in general terms, can be derived from individual parameters relating to the connection partner.

Figure 15:
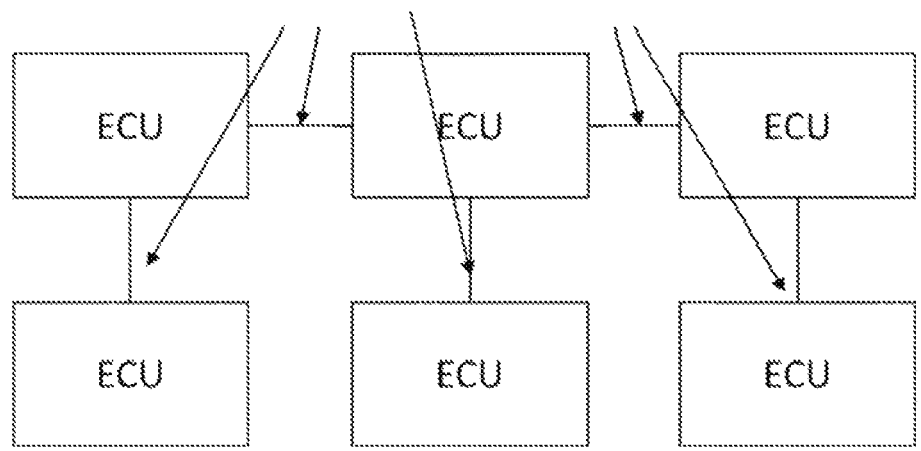
FIG. 15 shows encrypted links using the generated dynamic key from the communication of the control units.

An individual and constantly changing key is generated on the basis of the line delay 221 and the message frequency 213. This key is unique per unit time and also different per link. As a result of this approach, there is no key twice in the network, as shown in FIG. 15. Generation of the keys from the combination of point-to-point line delay and the frequency of the crystal makes the key particularly resistant to attempts to circumvent it, since firstly the key is constantly changing and secondly it will be different on each link in the vehicle network.

The two values can either be used directly in combination or can be expanded by other static values, which must be known to both control devices, such as for example the address, in order to generate the keys.

The respective control unit, the method being able to be executed on both control units, or subscribers/link partners, ascertains a random value therefrom in order to obtain the individual key for the encryption, which key is valid only for a short time. As shown in FIG. 3, the key changes recurrently, based on the previous measurements, which do not represent any additional effort since they are used for time synchronization.

The type of the transmission medium 12 is communicated to a program 13 in the Ethernet on-board network 2. The program 13 may be present, for example, in the first control unit 3, the second control unit 4 or the third control unit 5 or a further control unit of the Ethernet on-board network 2. The type of the transmission medium 12 is taken as a basis for adapting a connecting path selection 14. As such, the program 13 can use the connecting path selection 14, for example, to send data by way of a different connecting path than before the connecting path selection. However, the program 13 can also interrupt the sending of data by way of the connecting path selection 14, for example, and can resume it at a later time.

According to the exemplary embodiment, a transmission security value 15 is assigned to the first connecting path 6 on the basis of the type of the transmission medium 12. The transmission security value describes a probability of loss of data transmitted by way of the connecting path. That is to say that the transmission security value 15 permits a statement about how reliably the data can be transmitted by way of the first connecting path. This is supplied to the entropy source 200. If a security limit value is not reached, for example, and the data can be transmitted only unreliably, then it must be expected that the data will reach their destination with a delay or, if it is not worth sending the data again on account of the requirement for the data to be up to date, will not reach their destination at all.

According to a further exemplary embodiment, delay times of a plurality of signals on the first connecting path 6 are determined and the fastest delay time of the plurality of signals is selected. The maximum speed 11 of the first connecting path 6 is then determined on the basis of the fastest delay time.

Figure 6:
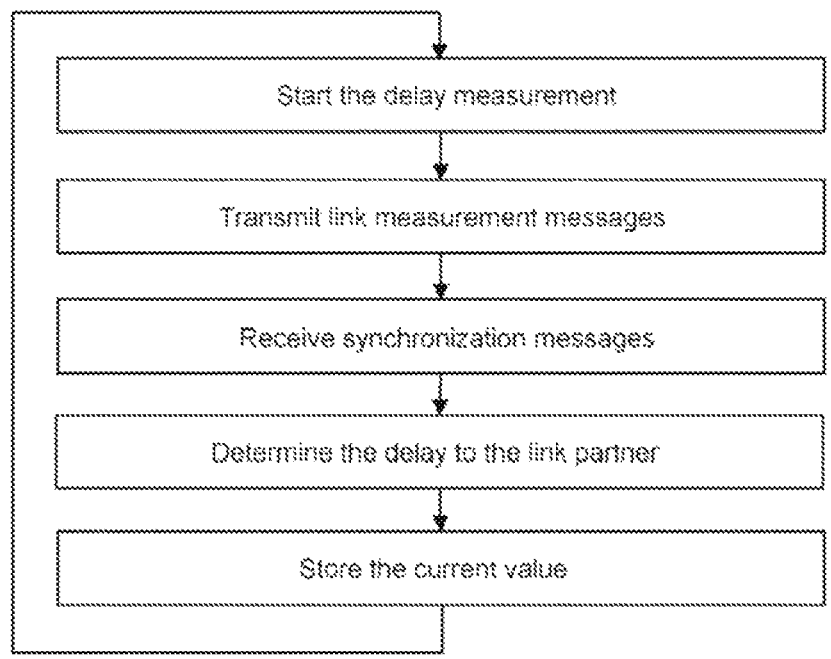
FIG. 6 shows a flowchart for the measurement of the delay, which forms the first parameter for the key.

A control unit starts the delay measurement and waits to receive the link partner messages. Based on receipt of the messages using the PTP example, the line delay can be measured as shown in FIG. 6. If one link partner starts the delay measurement, the other link partner will inevitably notice this and should also start a measurement so that these two measurements can also generate a related measured value, as shown in FIG. 3.

To explain, the procedure is demonstrated here using the example of PTP. PTP defines three mechanisms: Measurement of the line delay between neighboring nodes, determination of the best clock and exchange of time information. The purpose of the peer delay mechanism is to measure the delay between two connected ports. The measured delay time is used to correct the time information of the nodes and to include this time. Delay_Request messages are sent cyclically by both communication partners independently of one another. If the respective node is IEEE 802.1AS compatible, it will respond with a Delay_Response and a Pdelay_Resp_Follow_Up message.

These messages are provided with a hardware timestamp upon arrival and are forwarded to the PTP application. This allows the latency and the time difference to the neighboring port to be determined. A port, the initiator, starts the measurement by sending a Delay_Request message to the port connected to it, the responder, and generating an exit timestamp t1. This exit timestamp denotes a hardware timestamp that is written as late as possible on leaving the Ethernet transceiver. When this packet arrives, the responder generates a timestamp t2. In response, the responder sends a Delay_Response message. In this message it transmits the reception timestamp t2 of the Delay_Request message. When this message leaves the responder, the responder in turn generates a timestamp t3, which is sent out in an immediately subsequent Delay_Response_Follow_Up message. When the initiator receives the Delay_Response message, it generates a timestamp t4. The initiator can use the four timestamps t1 to t4 to calculate the average delay time for the routes covered.

PTP defines a master/slave clock hierarchy with a best clock within an AVB network. The time base for the nodes in this network is derived from this clock, the grandmaster. The Best Master Clock Algorithm (BMCA) is used to determine this clock type and to announce this information in the network. IEEE 802.1AS compatible systems send cyclic Announce messages to their neighboring nodes with information about the best clock in the AVB cloud. The recipient of such a message compares this information with the features of its clock and any messages already received from another port. A time synchronization spanning tree is set up on the basis of these messages. In the course of this, each port is assigned one of four port statuses. The port that has a shorter path to the grandmaster than its link partner is provided with the "master port" status. The "slave" status is assigned when no other port at this node has this status yet. Disabled is selected by the port that cannot fully support the PTP protocol. The "passive" status is selected if none of the other three statuses apply.

The time information is finally exchanged by way of the Sync_Follow_Up mechanism. The master ports cyclically send Sync and Follow_Up messages to the neighboring link partner. When the sync message leaves the master port, a timestamp is generated that is immediately transmitted in a subsequent Follow_Up message. This timestamp corresponds to the current time of the grandmaster at the time at which the Sync message is sent. The messages originating from the grandmaster are not forwarded, but rather regenerated in each node, including the switches. The measurement to determine the individual crystal frequency, derived from the message frequency, then starts. The frequency can be calculated on the basis of the receipt of the messages using the PTP example, as shown in FIG. 3. It is not always evident that the link partner is also measuring the frequency at the same time, which is why the frequency measurement should be carried out constantly.

The type of the transmission medium 12 for the second connecting path 7 and/or the third connecting path 8 can also be determined analogously to the approach described above. The respective recorded values are different, remain secret and stored in the control device each time and are also not transmitted over the network-nor do they have to be. Discovery of the key by mere trial and error is sufficiently improbable. An individual key is generated by taking the two values into account. First, the frequency of each crystal is different, and second, the line delay of each link is different. Here, two fluctuating values are added together, giving a third value—the value of the key—that is even harder to guess. The line delay may typically be in the range of 50-500 nanoseconds and the frequency is a parameter and is given in +/−ppm. The round-trip line delay is based on the same channel, which is why the calculated values on both sides of the link are identical. The parameters therefore do not have to be exchanged.

The NRR determines the measured ratio between the frequency of the LocalClock unit of the Timeaware system at the other end of the connection connected to this port and the frequency of the LocalClock unit of this timed system.

Time Awareness System can be equated with control unit here.

The NRR is also available to both partners without its needing to be exchanged. The sending node knows exactly when the message was sent (hardware timestamp) and the receiving node knows from the previous line measurement exactly when this message was sent.

This means that both partners have the same values for generating the key at almost the same time. One link partner encrypts using these two values resulting from the last measurement and the other link partner decrypts using its last values.

There is thus also provision for a delay time 16 of a second signal 17 on the second connecting path 7 to be determined. A maximum speed 18 of the second connecting path 7 is then determined on the basis of the delay time 16 of the second signal 17. A type of the transmission medium 19 of the second connecting path 7 is in turn determined on the basis of the maximum speed 18 of the second connecting path 7.

Figure 10:
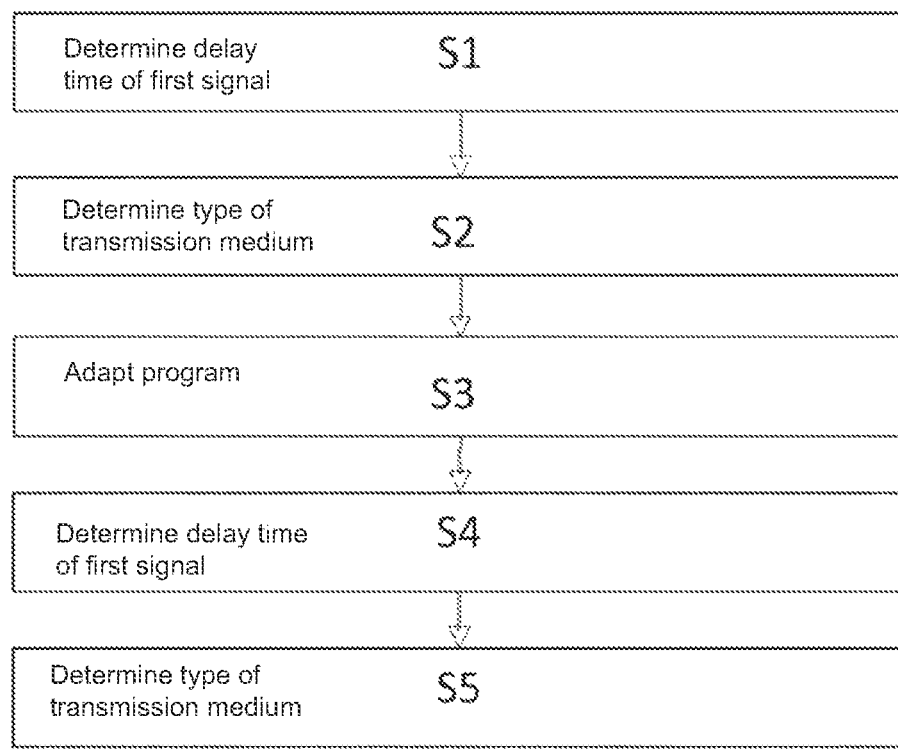
FIG. 10 shows a flowchart for the determination of a type of a transmission medium of the respective connecting path.

It is advantageous to use the current key A1 as long as no new line measurement is carried out, as suggested in FIG. 10. In this way, the link partner always knows which key to use if no new line measurement has been initiated beforehand. A new key should/can be either generated cyclically, e.g. predefined frequency, or started as required, by a trigger or always directly before important messages are sent.

Both the first control unit 3 and the second control unit 4 and also the third control unit 5 can be operated in a normal operating mode or in an energy-saving mode. In the energy-saving mode, the respective control unit consumes less energy than in the normal operating mode. For example, in the energy-saving mode, the speed of a port of the respective control unit can be reduced in comparison with the speed in the normal operating mode. The reduced speed of the port then also affects the respective maximum speed of the respective connecting path.

According to a further exemplary embodiment, a service message 20 can be sent from the first control unit 3 to the third control unit 8. The determination of a delay time 21 of a third signal 22 is then triggered by the service message 20. The third signal 22 is sent between the second control unit 4 and the third control unit 5. According to the exemplary embodiment, the delay time 21 of the third signal 22 is determined by the third control unit 5.

Figure 7:
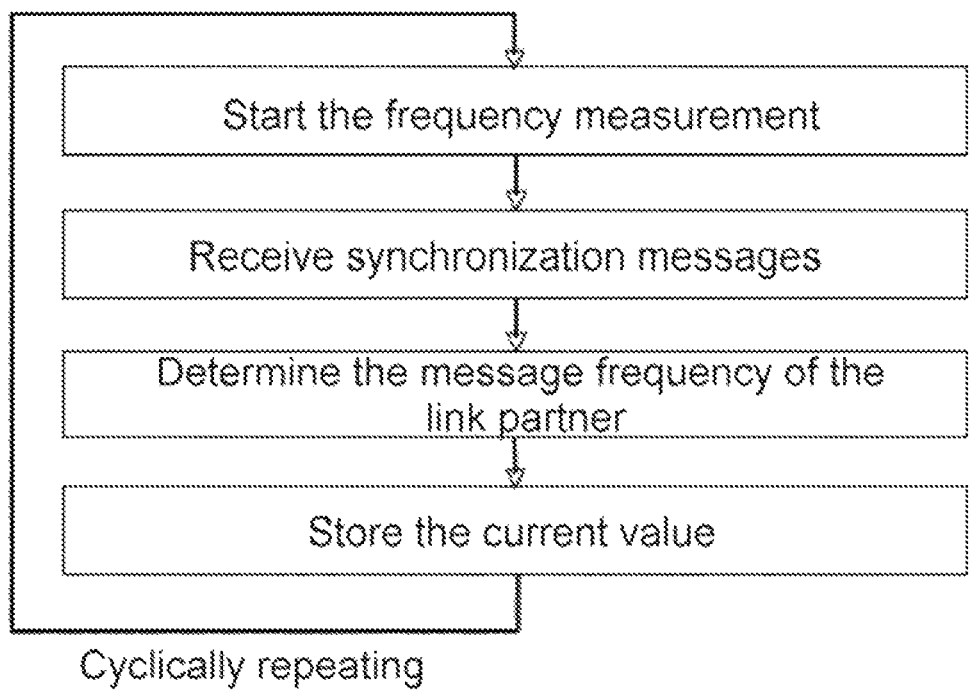
FIG. 7 shows a flowchart for the determination of the individual crystal frequency, which forms the second parameter for the key.

FIG. 7 provides a general description of the method for determining the delay time. The delay time 9 of the first signal 10 is determined in a step S1. The type of the transmission medium 12 is determined in a step S2. Finally, the program 13 is adapted in a step S3.

Figure 8:
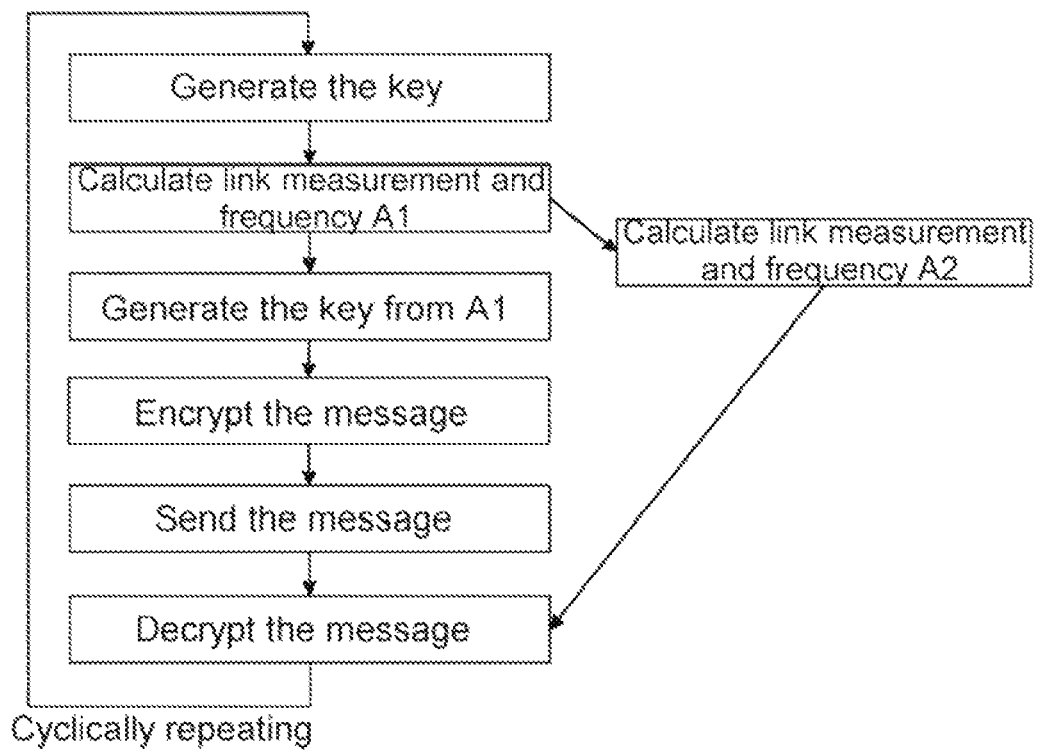
FIG. 8 shows a flowchart for the calculation of the key and for the sending of the messages.

FIG. 8 shows a flowchart for the calculation of the respective parameters or the respective parameters that are assigned to the type of the transmission medium 12. The delay time 9 of the first signal 10 is determined in a step S4. As a result, the type of the transmission medium 12 can be determined in a step S5. The type of the transmission medium 12 may in turn comprise the following parameters: speed 23, medium 24, cable length 25, power transmission 26, bit error rate 27. Finally, the adaptation of the program 13 and the connecting path selection 14 then follow in a step S6.

According to the exemplary embodiment, it is proposed that the delay time of the signals between connected control units or controllers be measured. Methods of the standard IEEE 1588 or IEEE 802.1AS, for example, can be used to measure the delay times 9, 16 and 21. Methods can also be provided by TTEthernet (time triggered Ethernet), for example, in order to determine the respective delay time 9, 16 and 21.

Figure 9:
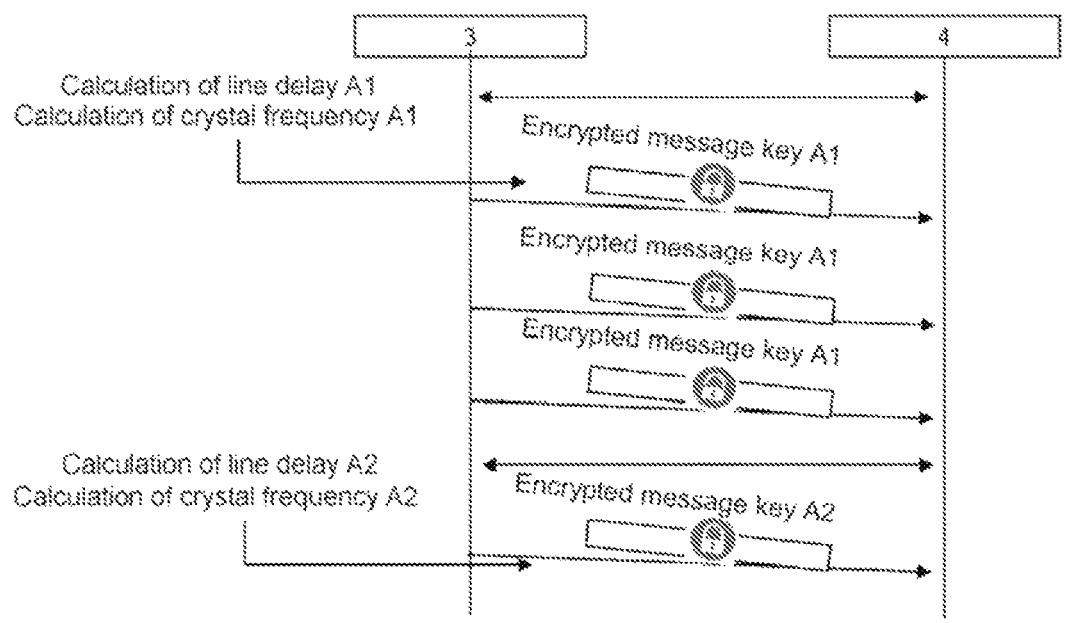
FIG. 9 shows a flowchart for the use of a key over time.

FIG. 9 shows the determination of the respective delay time of the first signal 9, delay time of the second signal 16 and delay time of the third signal 21 between the first control unit 3 and the second control unit 4. Local and nonlocal querying of the delay time are described. The program 13, which is executed in particular on at least one control unit, preferably first of all locally determines the local delay time, or the delay times if more than one control unit is directly connected. Other control units are then preferably queried for their delay time to the neighbor by way of a service-oriented method, for example SOME/IP (Scalable Service-Oriented Middleware over IP). This can be implemented either centrally or in a decentralized manner. The querying can either be carried out once, on system startup, definition or after a software update, or can be performed cyclically in order to detect dynamic changes. These data are then stored and assigned for the first time, in particular including the addresses of the control units.

Figure 12:
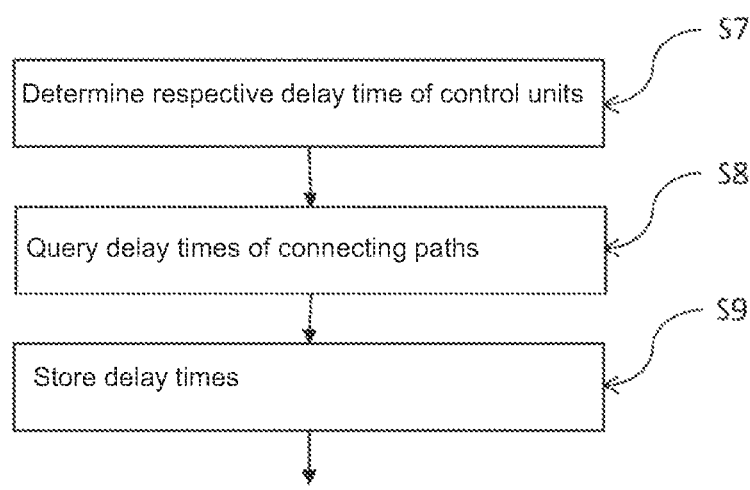
FIG. 12 shows a flowchart for the determination and storage of a delay time of a signal.

FIG. 12 shows that the respective delay time to the directly connected control units is determined in a step S7. The respective delay times of other connecting paths are queried in a step S8. The respective delay times and the associated connection partners thereof are stored in a step S9.

FIG. 10 shows a further method for deriving the other speeds on the basis of a reference measurement. The delay time 9 of the first signal 10 is determined in a step S1. The type of the transmission medium 12 is determined in a step S2. Finally, the program 13 is adapted in a step S3. The delay time 9 of the first signal 10 is determined in a step S4. As a result, the type of the transmission medium 12 can be determined in a step S5.

If, for example, the current temperature is very high or poor cables are used, prestored values may possibly be too inaccurate. It is therefore proposed that the application, or the program 13, itself carries out measurements on its own control unit, in particular in light of its own parameters and other speeds that can then be derived and calculated therefrom.

Figure 11:
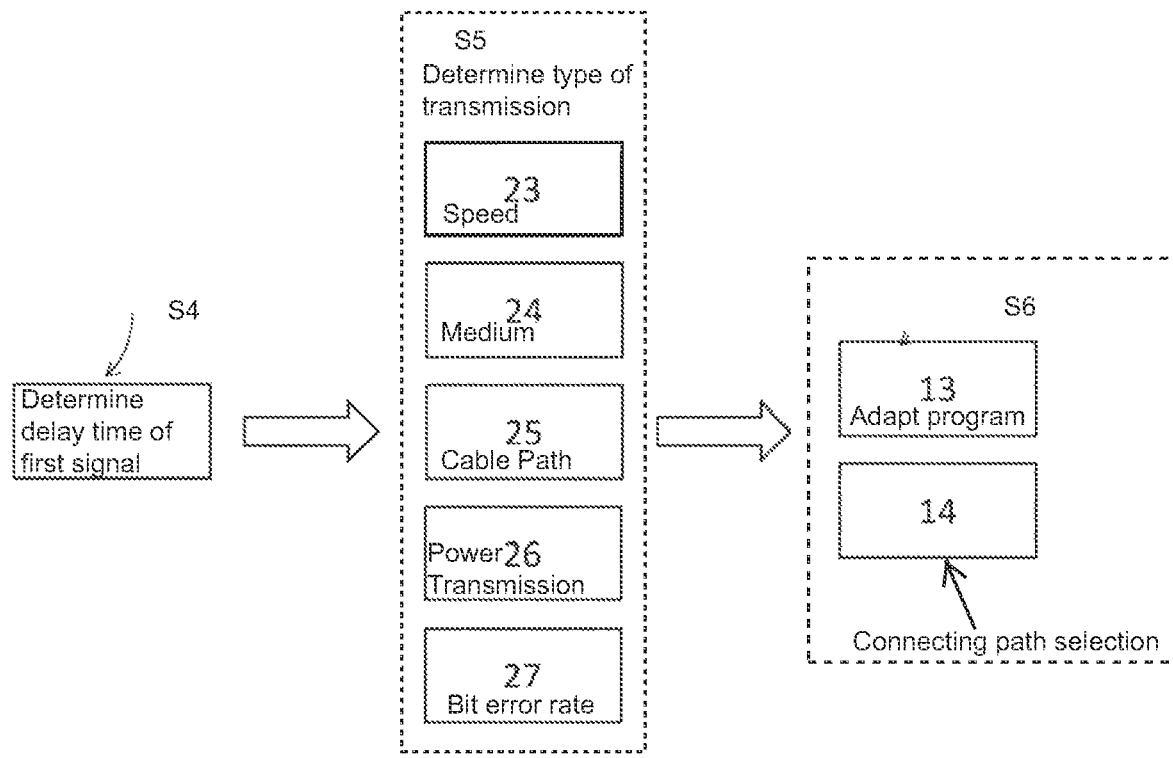
FIG. 11 shows a flowchart for the adaptation of a program in the Ethernet on-board network.

FIG. 11 shows that the delay time 9 of the first signal 10 is determined in a step S4. As a result, the type of the transmission medium 12 can be determined in a step S5. The type of the transmission medium 12 may in turn comprise the following parameters: speed 23, medium 24, cable length 25, power transmission 26, bit error rate 27. Finally, the adaptation of the program 13 and the connecting path selection 14 then follow in a step S6.

Figure 13:
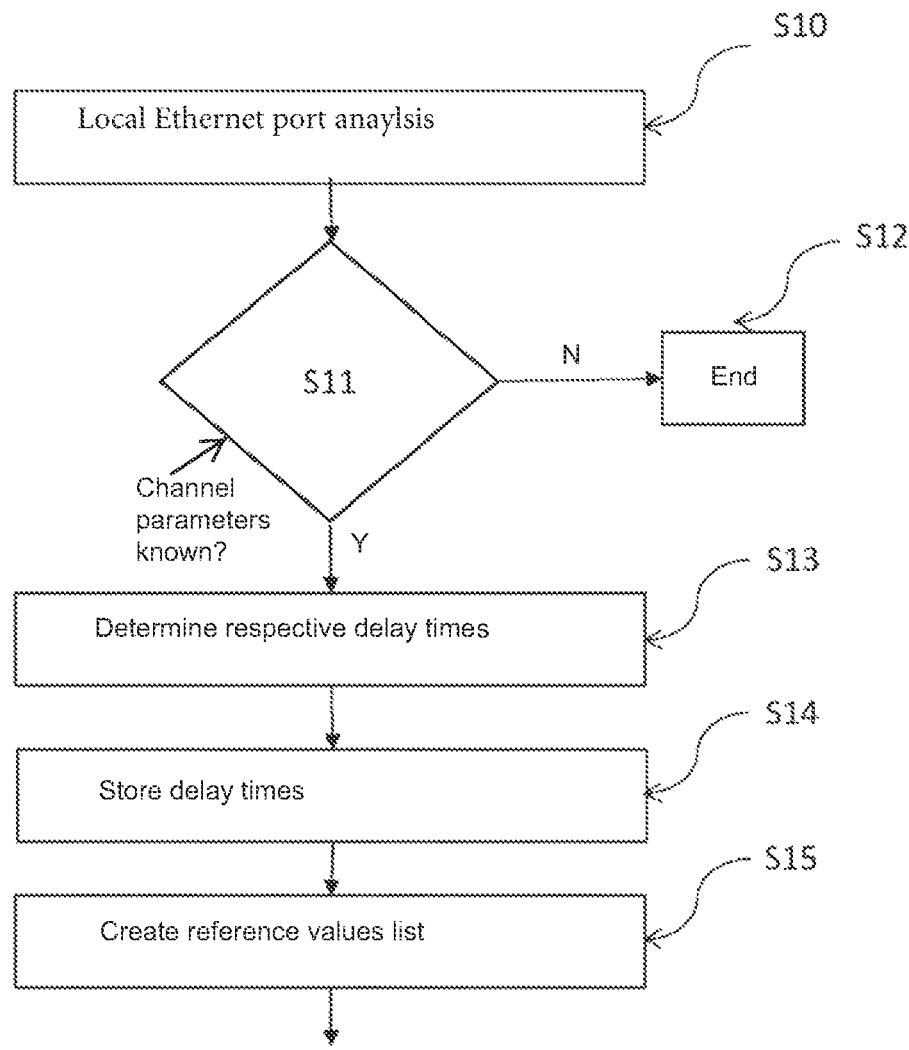
FIG. 13 shows a flowchart for the creation of a reference value list of delay times.

FIG. 13 depicts that one analysis per local Ethernet port is carried out in a step S10. A test for whether channel parameters are known is performed in a step S11. If this is not the case, a step S12 follows and the method ends. If this is the case, a step S13 follows, in which the respective delay time 9, 16 and 21 is determined. The storage takes place in a step S14 and the determined delay time is related to the channel parameters. A list of reference values is created in a step S15.

Figure 14:
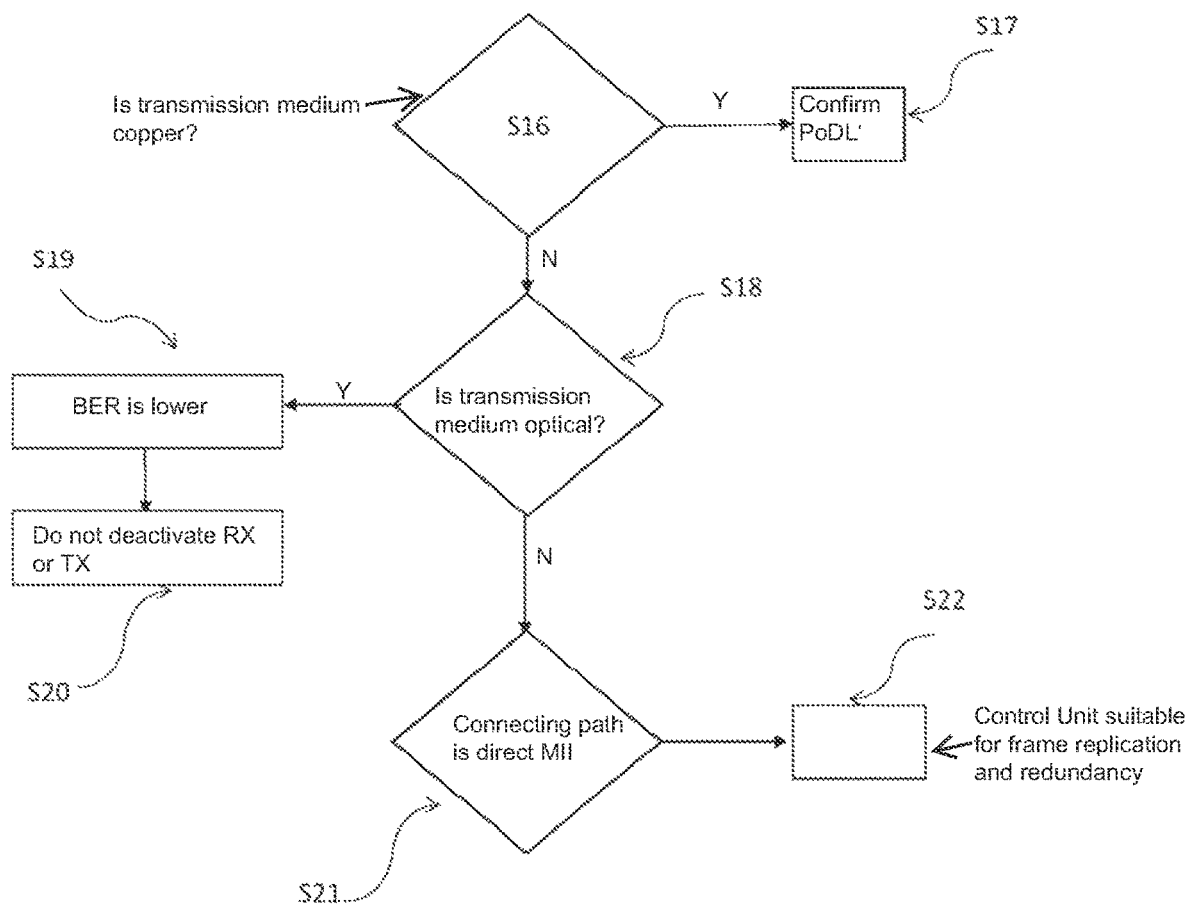
FIG. 14 shows a flowchart for the illustrative adaptation of a program in the Ethernet on-board network.

FIG. 14 shows possible optimization by means of knowledge of the type of the transmission medium 12, 19. A decision is made as to whether the type of the transmission medium 12, 19 is copper in a step S16. If this is the case, a step S17 follows, in which it is confirmed that PoDL (Power over Data Lines), that is to say the supply of power via Ethernet, is possible. If the decision in step S16 is that the medium is not copper, a step S18 follows. A check to ascertain whether the type of the transmission medium 12 is optical is performed in step S18. If this is the case, a step S19 follows. In step S19 it is found that the bit error rate is therefore lower and the reliability of this connecting path is therefore higher. The option of deactivating RX (receiving unit) or TX (transmitting unit) of the control unit 3, 4, 5 if it is not required is provided in a step S20.

If the decision in step S18 is that the medium, or the type, of the transmission medium 12 is not optical, it is assumed in a step S21 that the respective connecting path, as the relevant connecting path, is in the form of a direct MII (Media Independent Interface) connection. In this case, the respective control unit is suitable, for example, for IEEE P802.1CB (Frame Replication and Elimination for Redundancy) and step S22 can be executed.

Further options arise from the knowledge of the transmission speed. Combined with the current data streams, data can be deliberately transmitted using a high bandwidth connection, for example, and other connecting paths that are not required can therefore be deactivated, thus making it possible to save energy.

In addition, for high bandwidth connections, there is the option of using redundancy mechanisms (e.g. IEEE 802.1CB). Since the data are continuously transmitted in a redundant manner in this case, a high bandwidth is required for this purpose. It is also conceivable to adapt the application depending on the speed of the transmission path. A camera can adapt the resolution of the image data to be transmitted depending on the speed of the link or the connecting path 6, 7, 8, for example.

Figure 16:
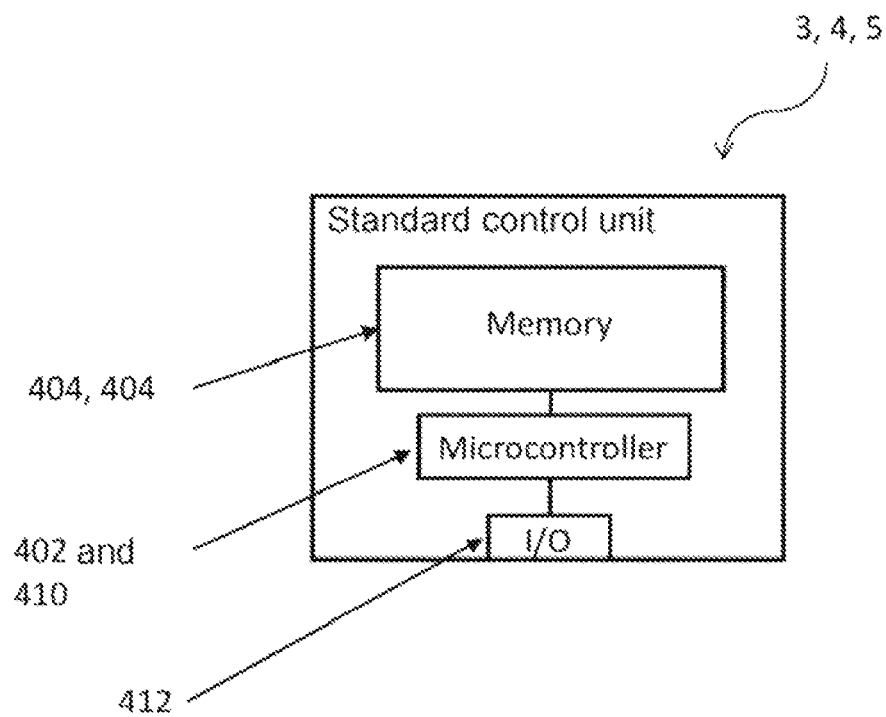
FIG. 16 shows the design of a control unit.
Figure 17:
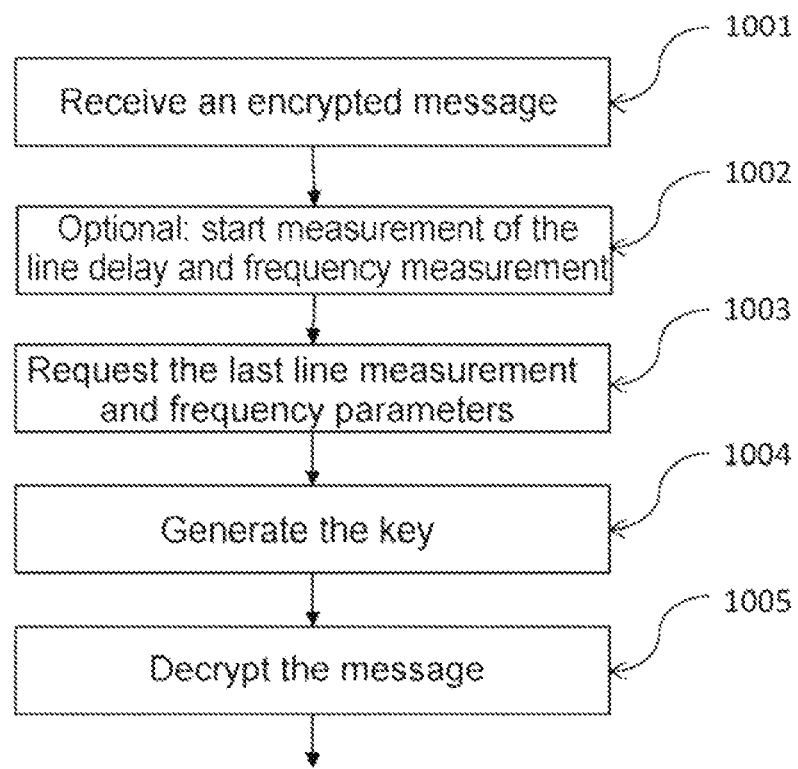
FIG. 17 shows a sequence for decoding.

FIG. 16 shows, that in addition to a microprocessor 402, the control unit 3, 4, 5 comprises volatile and nonvolatile memory 404, 406, two communication interfaces 408 and a synchronizable timer 410. The elements of the network device are communicatively connected to one another by way of one or more data connections or data buses 412. The nonvolatile memory 406 contains program instructions that, when executed by the microprocessor 402, implement at least one embodiment of the method according to an aspect of the invention and the entropy source is formed in the volatile and/or nonvolatile memory 404, 406, said entropy source then being used to form the dynamic keys 28 for the connecting paths 6. The decoding sequence of the dynamic key during decryption is shown in FIG. 17 with the steps receive an encrypted message 1001, start measurement of the line delay and frequency measurement 1002, request the last line measurement and frequency parameters 1003, generate the key 1004, decrypt the message 1005.

LIST OF REFERENCE SIGNS

1 Motor vehicle
2 Ethernet on-board network
3 First control unit
4 Second control unit
5 Third control unit
6 First connecting path
7 Second connecting path
8 Third connecting path
9 Delay time of the first signal
10 First signal
11 Maximum speed of the first connecting path
12 Type of transmission medium of the first connecting path
13 Program
14 Connecting path selection
15 Transmission security value
16 Delay time of the second signal
17 Second signal
18 Maximum speed of the second connecting path
19 Type of transmission medium of the second connecting path
20 Service message
21 Delay time of the third signal
22 Third signal
23 Speed
24 Medium
25 Cable length
26 Power transmission
27 Bit error rate
28 Dynamic key
29 Time synchronization message
200 Entropy source
211 Sending at time t1
212 Reception at time t4
213 Reception at time t4
221 Reception at time t2
222 Sending at time t3
223 Delayed sending at time t3
300 Encrypted message at time t5
400 Control unit
402 Microprocessor
404 RAM
406 ROM
408 Communication interface
410 Timer
412 Bus/communication interface
1001 Receive an encrypted message
1002 Start measurement of the line delay and frequency measurement
1003 Request the last line measurement and frequency parameters
1004 Generate the key
1005 Decrypt the message
A1 Calculation of line delay 1 and calculation of crystal frequency 1
A2 Calculation of line delay 2 and calculation of crystal frequency 2

B1 Calculation of line delay 1 and calculation of crystal frequency 1

B2 Calculation of line delay 2 and calculation of crystal frequency 2

The invention claimed is:

1. A method for securing the time synchronization of an Ethernet on-board network of a motor vehicle, the method comprising:
    determining a delay time of a first signal on a first connecting path between a first control unit of the Ethernet on-board network and a second control unit of the Ethernet on-board network;
    determining a maximum speed of the first connecting path on the basis of the delay time; and
    determining a type of a transmission medium of the first connecting path on the basis of the maximum speed,
    wherein the determination of the delay time of a first signal and the determination of the maximum speed of the first connecting path and the determination of the type of a transmission medium of the first connecting path result in an entropy source being formed that is used to ascertain at least one dynamic key for the connecting path that is used to encrypt a time synchronization message for the connecting path.

2. The method as claimed in claim 1, wherein the dynamic key for the connecting path is unique per unit time and for each link and in the Ethernet on-board network.

3. The method as claimed in claim 2, wherein the dynamic key for the connecting path is generated by combining a point-to-point line delay and the message frequency.

4. The method as claimed in claim 1, wherein the dynamic key for the connecting path is generated by combining a point-to-point line delay and the message frequency.

5. The method as claimed in claim 1, wherein
    the type of the transmission medium is communicated to a program in the Ethernet on-board network and a connecting path selection of the program is adapted according to the type of the transmission medium and the program records all information of the entropy source and the dynamic key for the connecting path is generated.

6. The method as claimed in claim 1, wherein
    the type of the transmission medium is determined as optical, copper or wireless.

7. The method as claimed in claim 1, wherein a transmission security value, which describes a probability of loss of data transmitted by way of the first connecting path, is assigned to the first connecting path on the basis of the type of the transmission medium.

8. The method as claimed in one of the preceding claims, claim 1, wherein delay times of a plurality of signals on the first connecting path are determined and the fastest delay time of the plurality of signals is selected, the maximum speed of the first connecting path being determined on the basis of the fastest delay time.

9. The method as claimed in claim 1, wherein a delay time of a second signal on a second connecting path, which is different from the first connecting path, between the first control unit and the second control unit is determined, and a maximum speed of the second connecting path is determined, a type of the transmission medium of the second connecting path being determined on the basis of the maximum speed of the second connecting path.

10. The method as claimed in claim 1, wherein the method is performed after the first control unit changes from a normal operating mode to an energy-saving mode and/or from the energy-saving mode to the normal operating mode.

11. The method as claimed in claim 1, wherein the delay time of the first signal is determined using the first control unit and a delay time of a third signal on a third connecting path, which is connected to the first control unit only indirectly, between the second control unit and a third control unit of the Ethernet on-board network is determined using the third control unit, the determination of the delay time of the third signal being triggered by a service message sent from the first control unit to the third control unit.

12. The Ethernet on-board network as claimed in claim 11, wherein
    the Ethernet on-board network has a third control unit, which is connected to the first control unit only indirectly and is connected to the second control unit directly by way of a third connecting path, wherein the third control unit is designed to determine a delay time of a third signal on the third connecting path, wherein the first control unit is designed to trigger the determination of the delay time of the third signal by way of a service message to the third control unit.

13. A control unit for an Ethernet on-board network, which, a first control unit, is designed:
    to send a signal to a second control unit of the Ethernet on-board network and to receive the signal from the second control unit;
    to determine a delay time of the signal on a connecting path to the second control unit;
    to determine a maximum speed of the connecting path on the basis of the delay time; and
    to determine a type of a transmission medium of the connecting path on the basis of the maximum speed,
    the control unit comprising at least:
    a microprocessor;
    a volatile memory and nonvolatile memory;
    at least two communication interfaces; and
    a synchronizable timer 410,
    wherein the nonvolatile memory contains program instructions that, when executed by the microprocessor, implement at least one embodiment of the method according to the invention as claimed in claim 1 and the entropy source is formed in the volatile and/or the nonvolatile memory, said entropy source being used to form the dynamic keys for the connecting paths.

14. An Ethernet on-board network for a motor vehicle, comprising a first control unit and a second control unit, wherein the control units are connected to one another by way of at least one connecting path, and the first control unit is designed as claimed in claim 13.

15. A non-transitory computer-readable medium on which the computer program product as claimed in claim 14 is stored.

16. A vehicle having multiple control units as claimed in claim 14, comprising an Ethernet on-board network.

17. A non-transitory computer program product comprising instructions that, when the program is executed by a computer, cause said computer to perform the method as claimed in claim 1.

* * * * *